Feb. 21, 1956

W. A. REX 2,735,743

TRANSFER OF HEAT IN FLUIDIZED SOLIDS SYSTEMS

Filed May 11, 1953

Walter A. Rex   Inventor

By *Edwin M. Thomas* Attorney

United States Patent Office 2,735,743
Patented Feb. 21, 1956

2,735,743
TRANSFER OF HEAT IN FLUIDIZED SOLIDS SYSTEMS

Walter A. Rex, Westfield, N. J.; Virginia C. Rex, administratrix of the said Walter A. Rex, deceased, assignor to Esso Research and Engineering Company, a corporation of Delaware Application May 11, 1953, Serial No. 354,278

3 Claims. (Cl. 23—1)

The present invention relates to the transfer of heat in fluidized solids systems. More particularly it relates to a method and apparatus for more effectively controlling and utilizing the heat which is associated with chemical and related reactions which take place with the aid of or in the presence of beds of fluidized solids. The invention has particular application to systems such as those used for conversion, for example, coking, cracking, reforming, etc., of hydrocarbon oils with the aid of finely divided solid particles such as catalytic materials, heat carriers, and the like. It is not limited to these uses, however, and can be applied to various systems and processes such as those used for oxidation or reduction of coal and other minerals, recovery of oil from shale, combustion processes and hydrogenation processes generally, and for chemical and/or heat transfer operations of various types.

It has been known for a number of years that a mass or a bed of particulate solids, such as granular catalysts of alumina or silica base, ground coal or shale, pulverized minerals and elements, sand, shot, coke particles and the like may be fluidized or caused to resemble a mobile ebullient liquid by passing a controlled gasiform stream through them. An important and widely used example of such a system is the catalytic cracking of hydrocarbon oils in the presence of a fluidized bed of finely divided solid catalytically active particles. The vapors of hydrocarbon to be cracked are passed through the bed of catalyst, along with supplementary fluidizing vapors or gases, such as steam, at such a rate and with such dispersion as to cause the bed to become fluidized. This fluidized mass, more or less resembling a boiling liquid, has a definite turbulent interface separating the dense bed from a superambient disperse phase, mainly gaseous or vaporous, in which some small particles of solids may be entrained. The interface between the dense fluidized mass and the disperse phase, under pressures which are not far from atmospheric, is very clearly defined. In fact, such interface is almost or quite as definite as the surface of a moderately agitated liquid under common low pressure conditions.

The prior art has taught also that the dense phase or fluidized solids beds, in systems of the type mentioned above, are highly useful as heat transfer media. By means of these fluidized solids systems enormous quantities of heat may be transferred especially by direct and to a lesser extent by indirect transfer methods. Such transfer, however, has usually been effected entirely or almost entirely within the fluidized bed itself. Above the interface or upper level of such fluidized bed, heat transfer rates are usually too low to be of much utility. In other words, the coefficient of heat transfer in conventional fluidized solids systems is very high in the fluidized bed itself and very low in the disperse phase above the bed. This sharp transition from very high heat transfer rates to very low as the interface is passed, has imposed definite limitations and restrictions on the utility of conventional fluidized solids systems in the prior art.

The present invention is based upon the discovery that new and unexpected temperature gradients and heat transfer coefficients and rates can be obtained in fluidized solids systems by (a) locating a heat transfer surface at or slightly above the dense bed level and (b) by careful distribution of fluidizing gases and/or vapors and selection and control of their velocity. The actual selection of the proper gas velocity will depend upon the operating pressure of the system.

According to the present invention, by effecting heat transfer at or near the top of such a bed and by causing or controlling the flow of the fluidizing gasiform stream through the solids bed, and operating the system preferably at an elevated pressure, which is desirably though not always necessarily at least 100 p. s. i. g., and may be up to 500 p. s. i. g. or more, an abnormal effective heat transfer rate may be obtained in the system. For example, by adding heat, instead of encountering a drastic drop in heat transfer rate as the normal interface of the fluidized bed is passed, rapid heat transfer is continued somewhat above the lower level of the normal or expected "disperse" phase. This may be due partly to a change in the character of the interface itself between fluidized and disperse phases. It may be that such an interface becomes less distinct at higher operating pressures. In any case, it is essential, for the purposes of this invention, that the effective velocity of the fluidizing fluid may be maintained within definite limits and that substantial heat transfer take place in part of the bed without substantially changing the bed temperature in other regions.

While the velocity limits of the fluidizing media in such a fluid solids bed system cannot be defined precisely, they are dependent upon ambient pressure to a large extent. To some extent they are dependent also upon the average particle size of the solids and, of course, upon their specific gravity. In general, however, flow rates of the fluidizing gas or vapor, for effective heat transfer above the normal interface, should be between about 0.2 and 1.25 feet per second. Pressures of up to 500 p. s. i. g. or more are permissible but the range of 150 to 300 p. s. i. g. is most suitable. A preferred operating pressure is around 200 p. s. i. g. The viscosity of the fluidizing gas also affects the final choice of the gas velocity to obtain the high heat transfer rates in the "dilute" phase or just above the normal interface.

The invention will be understood more fully and clearly by reference to specific examples and operating data which follow. Reference will be made next to the drawings accompanying this specification wherein.

Figure 1:
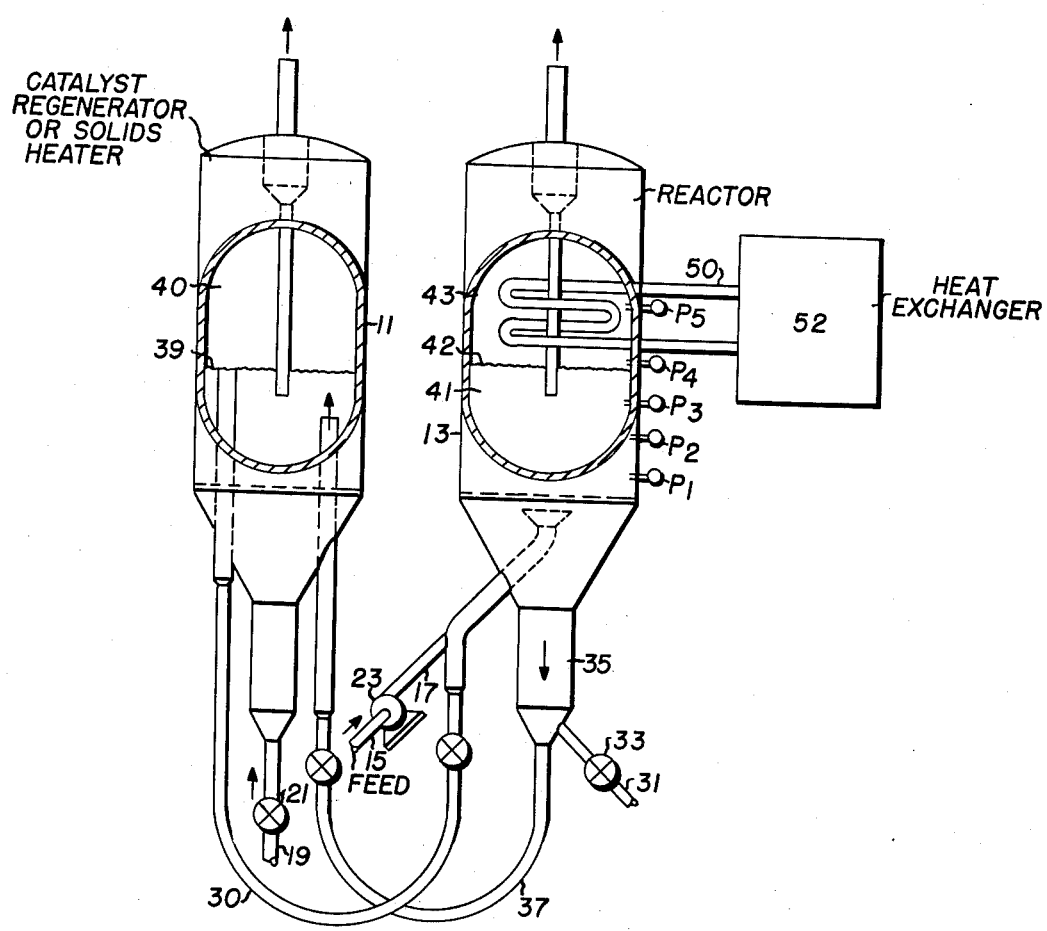
Fig. 1 is a diagrammatical elevational view, with parts shown in section, of a fluid bed system being operated for effective heat transfer over a wide range.

Referring first to Fig. 1 there is shown a more or less conventional fluidized solids type catalytic reactor-regenerator system such as is used in the cracking and/or reforming of petroleum hydrocarbon feed stocks to convert them to more valuable products. Such a system obviously may be used for non-catalytic solids as well as catalytic, e. g. for chemical treatment such as reduction, oxidation, hydrogenation, dehydrogenation, etc. of finely divided minerals, metals, ores, coal, oil shale, etc., or for carbonization or coking of residual hydrocarbon oils, etc. as previously mentioned. To such a system, the present invention is applied in the manner and for the purposes set forth hereinafter.

The system of Fig. 1 comprises two major vessels designated respectively as "catalyst regenerator" 11 and "reactor" 13. The "regenerator" 11 may, in some cases, be simply a solids heater and the "reactor" may be primarily a system for heating, vaporizing, etc., a liquid or vaporous (or gaseous) material.

Typically, a liquid or vaporous material, e. g. a hydrocarbon oil, preferably but not always necessarily preheated, is fed through an inlet 15 into a feed line 17 where it comes into contact with a stream of finely divided and preheated solid particles flowing in the direction of the arrow. For example, the feed may be a petroleum naphtha fraction which is to be reformed or hydroformed to improve its octane number. In this case the solids would be hydrogenation or dehydrogenation catalysts such as $MoO_3$ or equivalent on a suitable base. Alternatively, the feed stock might be a residual petroleum oil which is to be coked, i. e. converted partly to lighter hydrocarbons and partly to coke particles. In such case the solids in line 17 would usually be catalytically inert particles of a fluidizable size, such as coke particles.

The solids, whether catalytic or inert, are preheated in vessel 11 by feeding a stream of oxidizing gas thereto through an inlet 19. This oxidizing gas may react with the solids themselves or with an added fuel or both. Since the system, for the present invention, preferably operates under elevated pressure, e. g. of about 100 to 500 or more p. s. i. g., the oxidizing gas, usually air or oxygen enriched air, is compressed by a pump or compressor, not shown, and forced into the vessel 11. Likewise the feed stock may be forced into the system by a pump or compressor 23. A fuel gas or a liquid fuel may be added if desired, where the solids themselves are not being burned or regenerated or where the heat evolved from burning carbonaceous material on the solids is too low in quantity to supply all the heat requirements of the process.

Combustion which takes place in the fluidized solids bed in vessel 11 heats the solids therein to a desired temperature which depends upon the type of conversion or reaction desired in vessel 13. For catalytic reforming or hydroforming of naphtha, the temperature of the solids bed in vessel 11 usually ranges between about 750° and 1100° F., 1200° F. being about maximum. For coking of hydrocarbon residues, when the solid particles are usually catalytically inert (typically coke particles) the temperature may be somewhat higher, e. g. up to 1500° F. or more. In this case the coke itself may be partly consumed to provide heat. For cracking of petroleum gas oils, regeneration or heating temperatures in vessel 11 usually will be between about 750° and 1150° F. The construction and operation of the system so far described are conventional and known in the art.

The hot solids pass through line 30, shown as a U-bend, to reactor 13. Suitable conventional means may be provided for keeping these solids fluidized in the line. After serving to heat and/or otherwise promote the reaction in vessel 13, the solids are returned to vessel 11 through a generally similar line 37 for reheating or regeneration or both. A stripping gas or vapor such as steam may be introduced through a line 31 and valve 33 to strip gases and vapors from the solids which flow downwardly from vessel 13 through a stripper zone 35 and on through the line 37 back to vessel 11.

Under conventional operation the finely divided solids in vessel 11 are fluidized by the upflowing gasiform fluid introduced at 19 and through valve 21 to form a fluidized bed which resembles a boiling liquid having a more or less distinct upper surface or interface 39. Above this interface there is the usual disperse phase 40 wherein some of the solids may be entrained in the upflowing gases. However, the amount of such solids entrained is normally so far below the proportion of solids in the dense phase below the interface as to be substantially negligible. This is because most fluidized beds hitherto have been operated at or reasonably near atmospheric pressures. Likewise, in reactor vessel 13, the fluidized solids form a relatively dense fluidized bed 41 with an upper level or interface 42 which separates it from the dilute phase 43 above.

When the system is operated under pressure of say 100 to 500 p. s. i. g., fluostatic measurements which may be taken at points $p_1$, $p_2$, $p_3$, $p_4$, and $p_5$, on vessel 13, for example, show progressive decreases in fluid pressure as one goes higher up the vessel. According to these measurements, which are commonly used in fluidized solids systems, the level of the interface or apparent interface can be determined as the point where the pressure drop per unit height of the bed falls sharply to a negligible value. This interface level is not substantially different in this respect in systems operating under substantial pressure from the interface in conventional systems operating at or near atmospheric pressure. It has been discovered, however, that the temperature gradient and the heat transfer properties of the higher pressure system are very markedly different from those of a lower or substantially atmospheric pressure system. Advantage is taken of this dispheric pressure system. Advantage is taken of this discovery to effect needed improvements in processes utilizing the fluid solids technique.

Thus, according to the invention, a heat exchange surface of substantial area is placed at or near the upper level of the bed. For example, a metal coil 50 is inserted in the system, preferably just above the bed top level or interface 41, though it may be slightly below or partly below and partly above said interface. This coil, of course, should have at least reasonably good heat conductivity and should have sufficient surface area to effect the necessary heat transfer. Depending upon the process going on in the reactor or vessel 13, coil 50 may be either a heating coil or a cooling coil. The coil is connected to a suitable heat exchanger indicated conventionally at 52.

The insertion of heat exchanging coils into a fluidized solids bed per se is well known and it is known also to use a coil which extends both below and above the interface. In a copending application, Serial No. 192,471, filed by the present inventor on October 27, 1950, such a coil is disclosed, the height of the bed being varied to control the heat exchange. To this extent, the present application is a continuation-in-part of the former.

In the present invention, however, the coil must be placed near the top level or interface of the fluid bed so as to exchange heat to a substantial degree with the solids at or near the bed interface. The coil is thus used to modify the temperature gradient which extends from the bottom to the top of the fluidized bed in accordance with the needs of the process. This imposes an abnormal condition on the bed, based on the peculiar effects of pressure and velocity, etc. of the gasiform fluid which is used to fluidize the finely divided solids in vessel 13. These peculiar effects will next be described.

Figure 2:
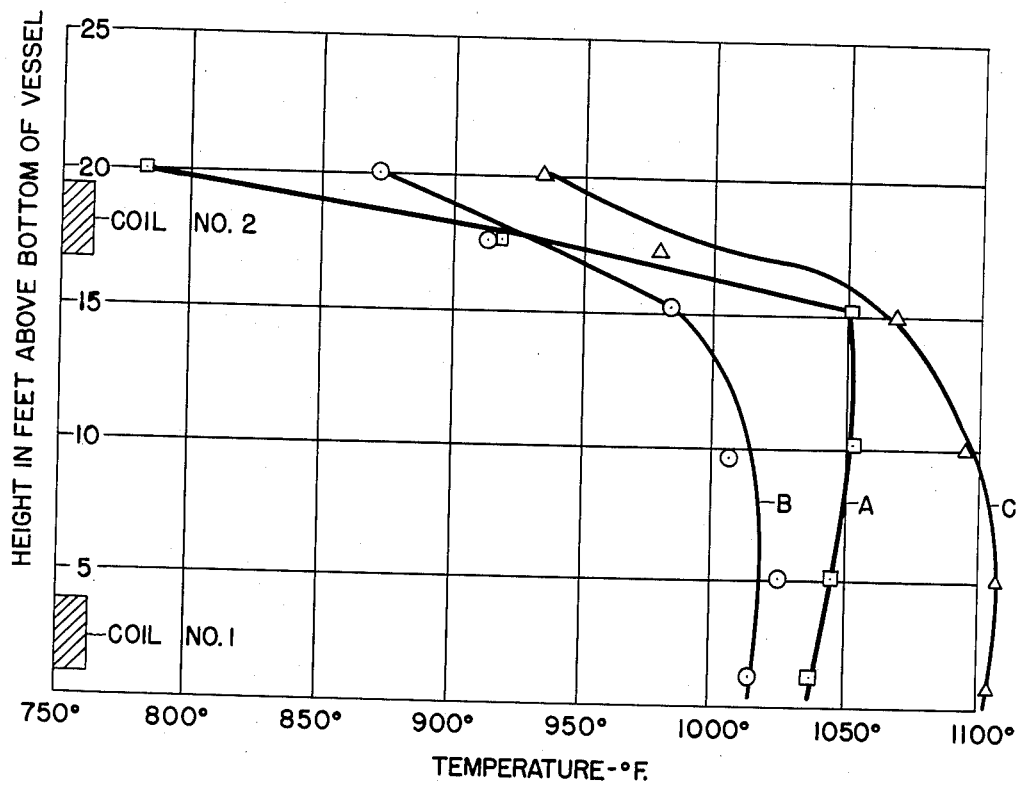
Fig. 2 is a graph showing typical temperature profiles in systems of the invention.

Referring to Fig. 2 there are shown three curves marked respectively A, B, and C. These experimental data were obtained in a fluidized solids vessel containing two cooling coils. The vessel was a regenerator in which carbonaceous deposits were being burned continuously from a reforming catalyst. The vessel and associated piping was enclosed in a duct heated with hot flue gases to compensate for heat losses and thus maintain a substantially adiabatic system. Water was continuously circulated through both cooling coils for heat removal at essentially the same flow rate. The location of these cooling coils is quite significant. Coil No. 1, as shown by the lower cross-hatched section along the ordinate of Fig. 2, was located near the bottom of the fluidized bed and was, of course, completely immersed in the fluidized bed during the experiments. Coil No. 2, the upper coil, was located as shown in Fig. 2 at the 17½ to 20 ft. level in the vessel.

Curve A shows the temperature gradient actually found in this fluidized solids vessel operating at 200 p. s. i. g. with an upflowing gas velocity of 0.35 foot per second, the fluidized solids being of the 45 to 60 micron average diameter range throughout all the experiments. This relatively low velocity was adequate for smooth fluidization at this pressure. The expected interface level was found at about 14 feet above the bottom of the vessel. The temperature from the bottom of the bed to the interface was almost constant at about 1050° F. At the interface the temperature dropped very sharply to below 800° F. because of cooling coil No. 2.

Curve B was obtained by increasing the rising gas flow rate to about 0.51 foot per second in vessel 13, pressure being maintained at 200 p. s. i. g. The fluidized solids and the gases were brought in at precisely the same temperatures as in curve A, the only difference being that in fluidizing gas velocity. However, the height of the interface was increased to the 18½ foot level and thus the top coil, coil No. 2, was partially covered by the dense bed. The contrast between curves A and B is highly significant. The prior art has considered it to be virtually impossible to get a substantial temperature gradient in a fluidized bed without placing a definite barrier in said bed such as a grid, a packed section, or the like. In the present example the bed showed a distinct temperature gradient as low as 10 feet above bottom and far below the interface as indicated by fluostatic pressures at $p_1$, $p_2$, $p_3$, etc. At 15 feet, the temperature was almost 70° F. lower than at the corresponding point on curve A. This is highly significant because it shows a definite gradient within the bed.

Curve C in Fig. 2 shows a comparable test run at an even higher fluidizing velocity of 0.72 foot per second, at 200 p. s. i. g. In this case the interface level was maintained at 15½ feet above the bottom of the vessel. This means that the dense phase level was 2 feet below coil No. 2. Even though this coil was completely above the bed level a large temperature gradient was still obtained in the dense bed itself as indicated by the temperature profile shown by curve C.

During all three of these tests the bottom coil, coil No. 1, was in operation and removing heat. However, it can be seen in Fig. 2 that there was no evidence of any significant temperature gradient near the bottom of the vessel where this coil was located in spite of the fact that the heat transfer coefficient and the actual heat removal by this coil was much larger than in the case of coil No. 2.

The following tabulation shows the heat transfer coefficients obtained in these tests:

| Operating Pressure | 200 p. s. i. g. | | |
|---|---|---|---|
| Test No. | A | B | C |
| Dense Bed Height, ft. | 14 | 18½ | 15½ |
| Fluidizing Gas Velocity, feet per second | 0.35 | 0.51 | 0.72 |
| Temperature Gradient in Dense Phase | No | Yes | Yes |
| Heat Transfer Coefficients, Btu./(hr.) (Ft.²) (° F.): | | | |
| (a) Bottom Coil, No. 1 | 288 | 218 | 293 |
| (b) Top Coil, No. 2 | 13 | 119 | 89 |

The coefficient for the bottom coil in all three cases was very high whereas there is a striking difference between the value of 13 for coil No. 2 in test A and the values of 89–119 for tests B and C. These latter coefficients are unexpectedly high and indicate that the location of the heat transfer coil with respect to the interface level and the choice of fluidizing gas velocity determine whether or not a temperature gradient can be imposed on the bed itself and whether or not high heat transfer coefficients are obtained in the dilute phase or at the interface. The fact that these unexpectedly high coefficients were found makes it possible to economically apply this discovery in commercial systems since only a nominal amount of heat transfer surface is required.

The critical conditions of operation required to obtain a substantial temperature gradient within the bed appear to be approximately (a) location of the heat transfer coil near the interface, i. e., above, at or below the interface within a maximum distance corresponding to about 20% of bed depth and (b) a fluidizing velocity between about 0.2 and 1.25 feet per second for the average particle size fluidizable solids. Operation under elevated pressure usually is desirable to obtain a good gradient and gas viscosity and other factors have some effect discussed in more detail below.

In order to take practical advantage of these peculiar relationships, coil 50 may be operated as a heating coil in the case of reactions where extended application of heat is advantageous. Conversely, in reactions where it is desired to cool, or quench, or terminate the reaction quickly, the coil can be supplied with a cooling circulant.

For example, in the case of hydroforming of naphthas, using a hydroforming catalyst such as $MoO_3$ or a platinum-containing catalyst of known type, the reaction is highly endothermic. It would be desirable in many cases to maintain a moderately high temperature longer, i. e. to prolong moderate heating of the vapors, without heating of catalyst to an excessive temperature. By circulating a heating fluid or fluidized material in the coil 50 at or near the interface, the temperature in the upper part of the bed can be held up and in some cases even increased without substantially heating the lower part of the bed. This establishment of an inverse (rising) temperature gradient in the fluidized solids bed without interposing grids, packing or other barriers in the bed itself, is highly advantageous and results in higher conversions and higher octane numbers in the finished product. At the same time, maximum catalyst temperature limits in the bed are held down so as not to injure the catalyst.

On the other hand, in the conversion of heavy hydrocarbon residues to lighter fuels (or chemicals) and coke, commonly called coking, the reaction, though endothermic, needs to be terminated very quickly after a predetermined contact time between hydrocarbon and solids to prevent further degradation of the products. A high initial temperature with short contact time and quick quenching is effective especially to avoid degradation of the more volatile products. In conventional fluid bed systems this quick quenching has been difficult to achieve. This difficulty is partly due to the normal uniformity or near uniformity of temperature throughout the bed and the consequently extended heating time to which hydrocarbon vapor is subjected as it passes through the bed. By operating at higher pressures, i. e. 100 to 500 p. s. i. g., for example, at a fluidizing velocity of about 1 foot per second at 100 p. s. i. g. and about 0.3 foot per second at 500 p. s. i. g., a definite temperature gradient, decreasing as it rises in the bed, is established within the bed. This gradient is obtained by inserting a cooling coil 50 at, above, or slightly below the indicated interface 41, i. e. within about 20% of bed depth from such interface. Hence, the products may be cooled more quickly and without excessive heat losses, even before they emerge from the bed.

It has been found, as previously mentioned, that the viscosity of the fluidizing gas also has an effect on the critical velocity-pressure relationship. For example, with flue gas or air at a temperature of about 1000° F. as the fluidizing medium, the following tabulation illustrates the critical velocity for several pressure levels:

| Fluidizing Gas | (¹) | (¹) | (¹) |
|---|---|---|---|
| Gas Viscosity, cp | 0.37 | 0.037 | 0.37 |
| Pressure, p. s. i. g. | 100 | 200 | 400 |
| Critical Velocity, feet per second | 0.7 | 0.4 | 0.3 |

¹ Air at 1,000° F.

If hydrocarbon vapors containing $H_2$ leaving a viscosity of about 0.020 centipoise at 900° F. is used as the fluidizing gas, the critical velocities at a given pressure are slightly higher:

| Fluidizing Gas | (¹) | (¹) | (¹) |
|---|---|---|---|
| Gas Viscosity, cp | 0.20 | 0.020 | 0.20 |
| Pressure, p. s. i. g | 100 | 200 | 400 |
| Critical Velocity, feet per second | 1.2 | 0.7 | 0.4 |

¹ H₂ and Hydrocarbons.

This factor of fluidizing gas viscosity should, therefore, be taken into account in applying this discovery to commercial plant designs. These figures pertain to fluidizable solids of the usual particle size range used in hydrocarbon conversion processes, i. e. about 10 to 200 microns average particle diameter. For finer particles fluidizing rates should be slightly lower and they should be adjusted upwardly for coarser particles.

It will be understood therefore that the invention makes it possible to establish a definite temperature gradient, either rising or falling, within the fluidized solids bed, without substantial interference with the bed or its fluidization. Hence, this invention imparts increased flexibility to the fluidized solids reaction system. It makes it adaptable to uses where its limitations (lack of temperature gradient within the bed) have hitherto been considered insuperable for some purposes.

What is claimed is:

1. In a fluid reaction process wherein a gasiform material is passed upwardly through a body of fluidized finely divided solids maintained in a fluid reaction zone as a dense phase bed of solids having an interface with a disperse phase of solids thereabove, wherein said reaction zone is maintained at a pressure substantially above atmospheric while fluidizing said bed with a fluidizing gas, including said gasiform material, at a velocity of from about 0.2 to about 1.25 feet per second, a method for establishing a temperature gradient in said dense phase bed which is abnormal to said reaction, comprising introducing a fluid head exchange medium into indirect heat exchange relation with said solids and said fluidizing gas within a vertically limited portion of said reaction zone wherein the upper and lower outside limits of said limited portion are at a distance from said interface which is not substantially greater than 20% of the full depth of said dense phase bed at the interface, and wherein said limited portion thus defined includes said interface.

2. A method according to claim 1, wherein said temperature gradient abnormal to said reaction is established downwardly from said interface as a rising temperature gradient, and wherein said fluid heat exchange medium is a coolant fluid introduced at a temperature lower than that of said dense phase bed.

3. A method according to claim 1, wherein said temperature gradient abnormal to said reaction is established downwardly from said interface as a descending temperature gradient, and wherein said fluid heat exchange medium is a heated fluid introduced at a temperature higher than that of said dense phase bed.

References Cited in the file of this patent

UNITED STATES PATENTS

| | | |
|---|---|---|
| 2,452,712 | Atwell | Nov. 2, 1948 |
| 2,474,583 | Lewis | June 28, 1949 |
| 2,503,291 | Odell | Apr. 11, 1950 |
| 2,506,317 | Rex | May 2, 1950 |
| 2,526,651 | Garbo | Oct. 24, 1950 |
| 2,589,984 | Borcherding | Mar. 8, 1952 |
| 2,671,723 | Jahnig et al. | Mar. 9, 1954 |
| 2,689,787 | Ogorzally | Sept. 21, 1954 |